United States Patent
Seo et al.

(10) Patent No.: US 6,822,717 B2
(45) Date of Patent: *Nov. 23, 2004

(54) IN-PLANE SWITCHING MODE LIQUID CRYSTAL DISPLAY DEVICE AND METHOD OF MANUFACTURING THE SAME

(75) Inventors: Seong Moh Seo, Anyang-shi (KR); Hyun Ho Shin, Kunpo-shi (KR); Young Jin Oh, NamyangJu-shi (KR); Hyun Chang Lee, Anyang-shi (KR); Chang Yeon Kim, Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,898

(22) Filed: Nov. 13, 2003

(65) Prior Publication Data

US 2004/0070720 A1 Apr. 15, 2004

Related U.S. Application Data

(60) Continuation of application No. 09/781,196, filed on Feb. 13, 2001, now Pat. No. 6,697,140, which is a division of application No. 09/235,205, filed on Jan. 21, 1999, now Pat. No. 6,445,435.

(30) Foreign Application Priority Data

Jan. 23, 1998 (KR) .............................. 98-2121

(51) Int. Cl.$^7$ ............................................ G02F 1/1343
(52) U.S. Cl. ......................... 349/141; 349/38; 349/39; 349/143
(58) Field of Search ............................. 349/38, 39, 42, 349/43, 138, 141, 143

(56) References Cited

U.S. PATENT DOCUMENTS 5,682,211 A * 10/1997 Yao et al. ...................... 349/38
6,091,473 A * 7/2000 Hebiguchi .................. 349/141

* cited by examiner

Primary Examiner—Tarifur R. Chowdhury
(74) Attorney, Agent, or Firm—McKenna Long & Aldridge LLP

(57) ABSTRACT

An in-plane switching mode liquid crystal display device comprises first and second substrates, a plurality of gate and data bus lines defining pixel regions and arranged on the first substrate, a plurality of data electrodes on same plane of the data bus lines these some parts are overlapped with adjacent gate bus line, a passivation layer on the data electrodes, a plurality of common electrodes on the passivation layer these some parts are overlapped with adjacent data electrodes, and a liquid crystal layer between the first and second substrates.

20 Claims, 4 Drawing Sheets

IN-PLANE SWITCHING MODE LIQUID CRYSTAL DISPLAY DEVICE AND METHOD OF MANUFACTURING THE SAME

This application is a continuation of prior application Ser. No. 09/781,196, filed Feb. 13, 2001, and is now U.S. Pat. No. 6,697,140; which was a divisional of prior application Ser. No. 09/235,205, filed Jan. 21, 1999, and is now U.S. Pat. No. 6,445,435.

BACKGROUND OF THE INVENTION

1. Field of the Invention

The present invention relates to a liquid crystal display device, and more particularly, an in-plane switching mode liquid crystal display device having a high aperture ratio.

2. Discussion of Related Art

Twisted nematic liquid crystal display devices (hereinafter TN LCDs) having high image quality and low power consumption are widely applied to flat panel display devices. The TN LCDs, however, have a narrow viewing angle due to refractive anisotropy of liquid crystal molecules.

To solve this problem, a multi-domain LCD such as a two-domain TN LCD (TDTN LCD) and a domain divided TN LCD (DDTN LCD), and a TN LCD including an optical compensation film have been introduced. In such LCDs, however, a contrast ratio is decreased and a color shift is generated depending on a viewing angle.

Further, for the purpose of a wide viewing angle, an in-plane switching mode LCD is also proposed. The in-plane switching mode liquid crystal display device, which is suggested to materialize wide viewing angle, is disclosed in the JAPAN DISPLAY 92 P547, Japanese Patent Unexamined Publication No. 7-36058, Japanese Patent Unexamined Publication No. 7-225388 and ASIA DISPLAY 95 P707, and etc.

FIG. 1A is a plan view of a unit pixel of a conventional in-plane switching mode active matrix LCD. FIG. 1B is a sectional view according to line I–I' of FIG. 1A. As shown in the drawings, the apparatus comprises a gate bus line 1 and a data bus line 2 in which the lines 1, 2 are perpendicularly arranged in a matrix form on a transparent first substrate 10 thereby defining an unit pixel region, a common line 3 arranged parallel to the gate bus line 1 in the pixel region, thin film transistor (TFT) formed adjacent a cross point of the gate bus line 1 and the data bus line 2, and a data electrode 8 and a common electrode 9 formed in the pixel region.

The TFT includes a gate electrode 5 electrically coupled with the gate bus line 1, a gate insulator 12 on the gate electrode 5, a semiconductor layer 15 on the gate insulator 12, a channel layer on the semiconductor layer 15, and source/drain electrodes 6, 7 which are electrically coupled the data bus line 2 and the data electrode 8 respectively.

The common electrode 9 is formed concurrently with the gate electrode 5 and electrically coupled to the common line 3. Further, a passivation layer 20 and a first alignment layer 23a are deposited on the inner surface of the first substrate 10.

On a transparent second substrate 11, a black matrix 28 is formed to prevent a light leakage generating around the TFT, the gate bus line 1, and the data bus line 2. A color filter layer 29, an over-coat layer (not illustrated), and a second alignment layer 23b are formed on the black matrix 28 in sequence. Finally, a liquid crystal layer 30 is formed between the first and second alignment layers 23a, 23b.

In general, a storage capacitor in a liquid crystal display device is applied to prevent the apparatus from a gray inversion, a flicker, and an afterimage. Methods of forming this storage capacitor are divided into a storage on gate (SOG) mode and a storage on common (SOC) mode. In the SOG mode, some part of the $(n-1)^{th}$ gate bus line is applied as a storage capacitor in the $n^{th}$ pixel region. Further, in the SOC mode, a separated electrode for storage capacitor is electrically coupled to the common electrode.

For the use of the above storage capacitor, the aperture ratio is decreased, and the metal lines may cause a short state, thereby decreasing a yield.

SUMMARY OF THE INVENTION

Accordingly, the present invention is directed to an in-plane switching mode LCD that substantially obviates one or more of the problems due to limitations and disadvantages of the related art.

An object of the present invention is to provide an in-plane switching mode LCD having the high aperture ratio and the high yield by using the SOG mode storage capacitor only, or both SOG mode storage capacitor and SOC mode storage capacitor.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve these and other advantages and in accordance with the purpose of the present invention, as embodied and broadly described, an in-plane switching mode liquid crystal display device comprises first and second substrates; a data bus line and a gate bus line arranged in a matrix on said first substrate and defining a unit pixel region; a thin film transistor (TFT) formed adjacent a cross point of the gate bus line and the data bus line, and a data electrode which partially covers adjacent the gate bus line; a passivation layer on the TFT and the data electrode; a common electrode substantially parallel to the data electrode and covering the gate bus lines of $n^{th}$ and $(n+1)^{th}$, or $n^{th}$ and $(n-1)^{th}$; a common line covering the gate bus lines of $n^{th}$ and $(n+1)^{th}$, or $n^{th}$ and $(n-1)^{th}$; a first alignment layer on the common electrode; a black matrix for preventing a light leakage which is generated around the TFT, the gate bus line, and the data bus line; a color filter layer and a second alignment layer on the black matrix in sequence; and a liquid crystal layer between said first and second substrates.

A storage capacitor is formed by the gate bus line, the data electrode, and the common electrode or the common line.

In another embodiment according to the present invention, certain part of the data electrode covers the nth gate bus line. In addition, a part of the common electrode covers adjacent the data electrode and another part of the common electrode does not cover the opposite data electrode and the gate bus line. In this case, the storage capacitor is formed by the gate bus line, the data electrode, and the common electrode or the common line.

According to another embodiment of the present invention, a liquid crystal display device has a substrate, first and second gate lines arranged substantially in parallel above the substrate, a bus line arranged to intersect the first and second gate lines to define a pixel, a transistor having a source and a drain formed near an intersection part of the bus line and the first gate line, the source being connected to the bus line, and at least one data electrode connected to the drain of the transistor. A passivation layer is generally formed above the transistors and the at least one data electrode. Moreover, at least one common electrode is arranged above the passivation layer in parallel with the second gate line, the common electrode and the data electrode. In this configuration, the portions of at least two of the second gate line, the data electrode and the common electrode are overlapping with each other.

According to one feature of the present invention, the portions of the second gate line, the data electrode and the common electrode all overlap with each other. Alternatively, the second gate line has no overlapping portions with the data electrode and the common electrode.

According to another feature of the present invention, the data electrode has no overlapping portions with the common electrode. Alternatively, the second gate line has no overlapping portions with the common electrode.

These and other aspects, features and advantages of the present invention will be better understood by studying the detailed description in conjunction with the drawings and the accompanying claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1A:
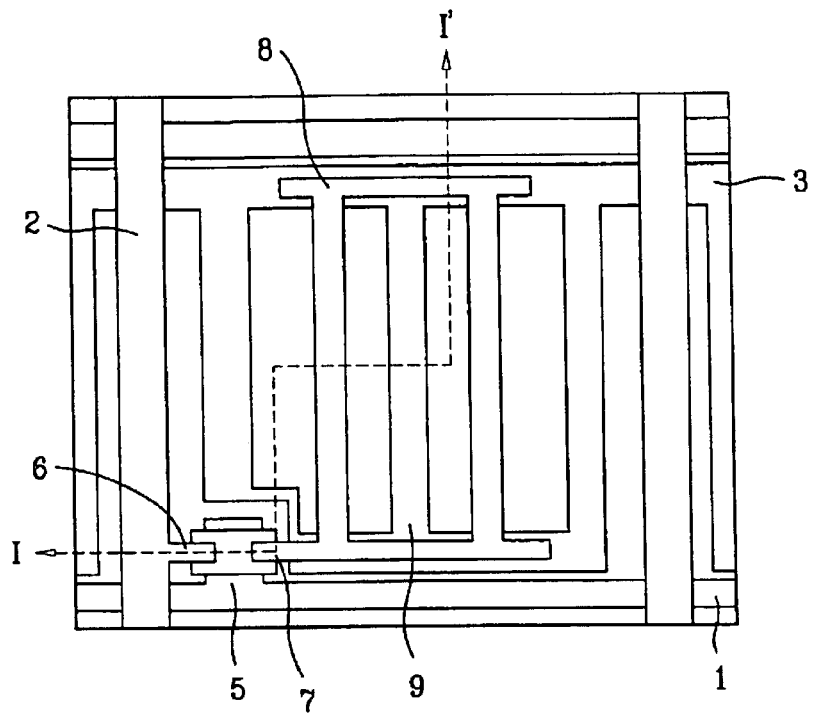
FIG. 1A is a plan view of a unit pixel of a conventional in-plane switching mode LCD.
Figure 1B:
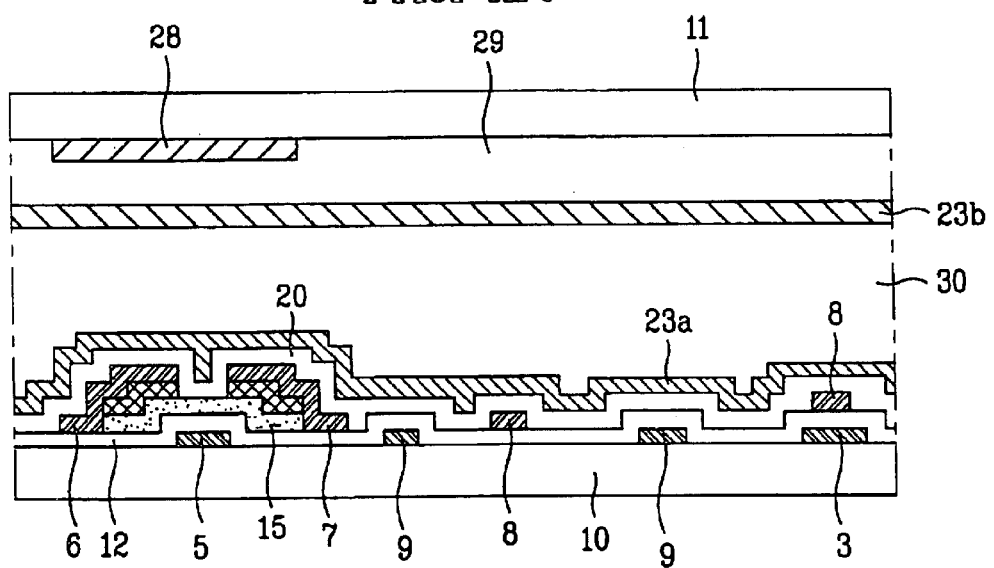
FIG. 1B is a sectional view according to line I–I' of FIG. 1A.
Figure 2A:
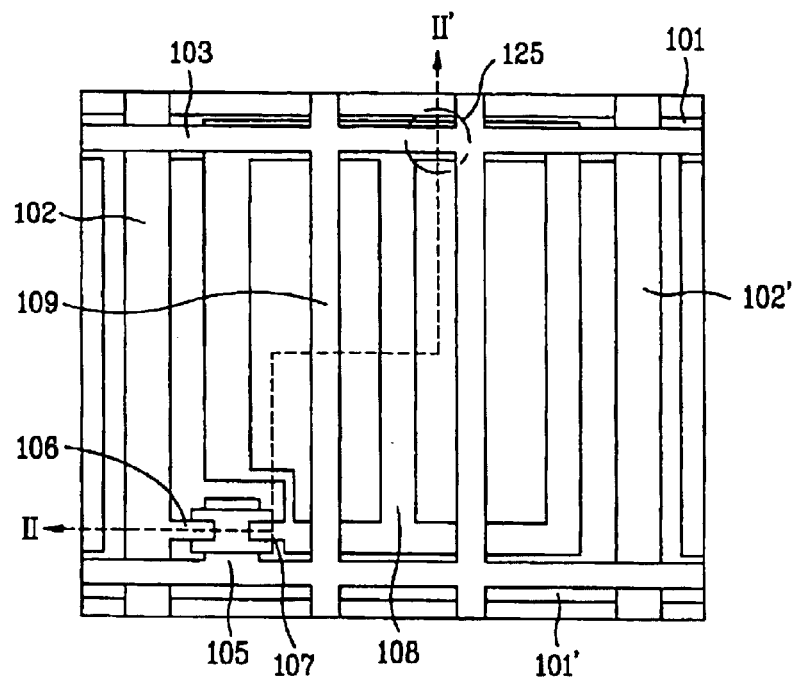
FIG. 2A is a plan view of a unit pixel according to a first embodiment of the present invention.
Figure 2B:
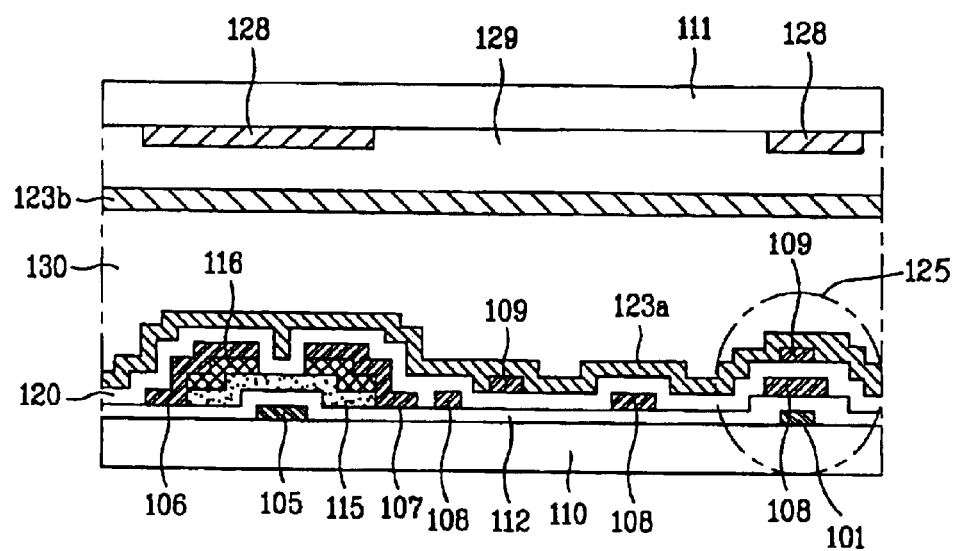
FIG. 2B is a sectional view according to line II–II' of FIG. 2A.

Reference will now be made in detail to the preferred embodiment of the present invention, example of which is illustrated in the accompanying drawings. FIG. 2A is a plan view of a unit pixel according to a first embodiment of the present invention. FIG. 2B is a sectional view according to line II–II' of FIG. 2A.

As shown in the drawings, in a unit pixel region of LCD according to the first embodiment of the present invention, two gate bus lines 101, 101' and two data bus line 102, 102' are perpendicularly arranged in a matrix form on a transparent first substrate 110 thereby defining the unit pixel region. Actually, LCDs have a plurality of pixel regions (n×m) including a large number of gate bus line (n) and data bus line (m). A gate insulator 112 is formed on the gate bus lines 101, 101'. The gate insulator 112 made of any suitable non-conductive materials, such as SiNx and SiOx, is formed on the gate electrode preferably by chemical vapor deposition (CVD) method.

A semiconductor layer 115 as channel layer is formed on the gate insulator 112 by depositing and etching an a-Si. An ohmic contact layer 116 made of a $n^+$ a-Si is formed on the semiconductor layer 115. The data bus lines 102, 102', a source electrode 106, and a data electrode 108 are formed above the ohmic contact layer 116 and the gate insulator 112. Then the data electrode 108 is formed by etching a metal thin film preferably made of Al, Cr, Ti, or Al alloy after they are deposited on the gate insulator 112 by a sputtering method.

Alternatively, after depositing and patterning the gate bus line made of Al, the gate electrode made of Cr is patterned. After that, on the substrate which the gate bus line is patterned, the gate insulator, the semiconductor layer and the ohmic contact layer are formed in sequence. The data electrode and the source/drain electrode are formed by depositing and patterning Cr after pad opening.

The passivation layer 120 is formed on the TFT, the data bus lines 102, 102', the data electrode 108, and the gate insulator 112 by depositing an inorganic material, such as SiNx or SiOx, or an organic material such as benzocyclobutene (BCB).

Further, after pad opening, a common electrode 109 and common bus line 103 are formed by etching a thin metal film preferably made of Al, Mo, Ta, Cr, Al, or indium tin oxide (ITO) alloy after they are deposited on the substrate :110 by a sputtering method, then a first alignment layer 123a is formed thereon. The common electrode 109 which is substantially parallel to the data electrode 108 is formed on the gate bus lines 101, 101'.

A circular mark 125 represents a group of electrodes which are overlapped to form a storage capacitor. In the present invention, the storage capacitor is formed by the common electrode 109 which is substantially parallel to the data electrode 108 and covers the gate bus lines of $n^{th}$ and $(n+1)^{th}$, or $n^{th}$ and $(n-1)^{th}$ and the common line which is on a same plane of the common electrode and covers the gate bus lines of $n^{th}$ and $(n+1)^{th}$, or $n^{th}$ and $(n-1)^{th}$.

On a second substrate 111, a black matrix 128 is formed to prevent a light leakage generating around the TFT, the gate bus lines 101, 101' and the data bus lines 102, 102' by etching a thin layer made of Cr, CrOx, or black resin which are deposited by sputtering method. A color filter layer 129, an over-coat layer (not shown), and a second alignment layer 123b are formed on the black matrix 128 in sequence, as shown in FIG. 2B. Finally, a liquid crystal layer 130 is formed between the first and second alignment layers 123a, 123b.

Preferably, each of alignment directions of the first and second alignment layers 123a, 123b is determined by a rubbing method using polyamide, polyimide, $SiO_2$, polyvinylalcohol (PVA) or polyamic acid, or by photo-alignment method using photosensitive material such as polyvinylcinnamate (PVCN), polysiloxanecinnamate (PSCN) or cellulosecinnamate (CelCN)

Figure 3A:
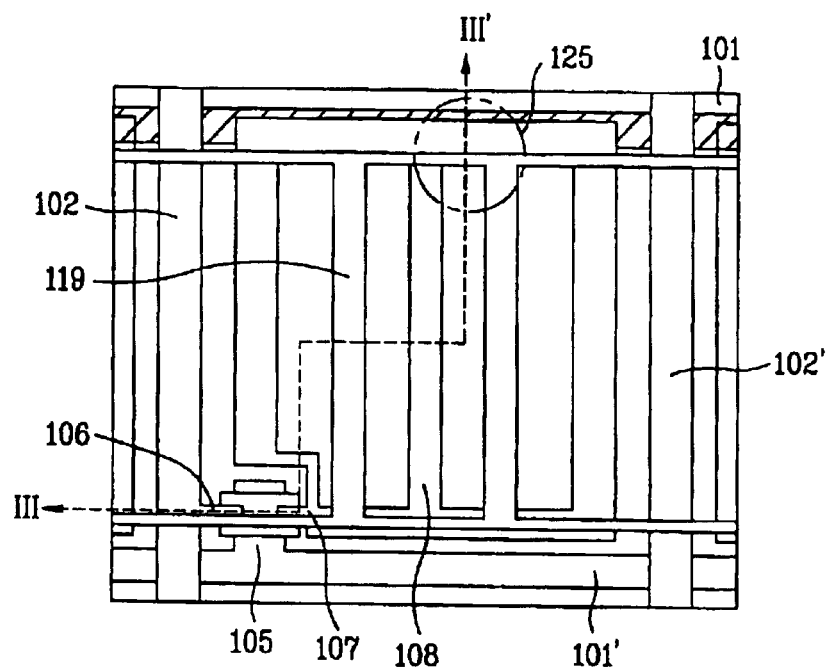
FIG. 3A is a plan view of a unit pixel according to a second embodiment of the present invention.
Figure 3B:
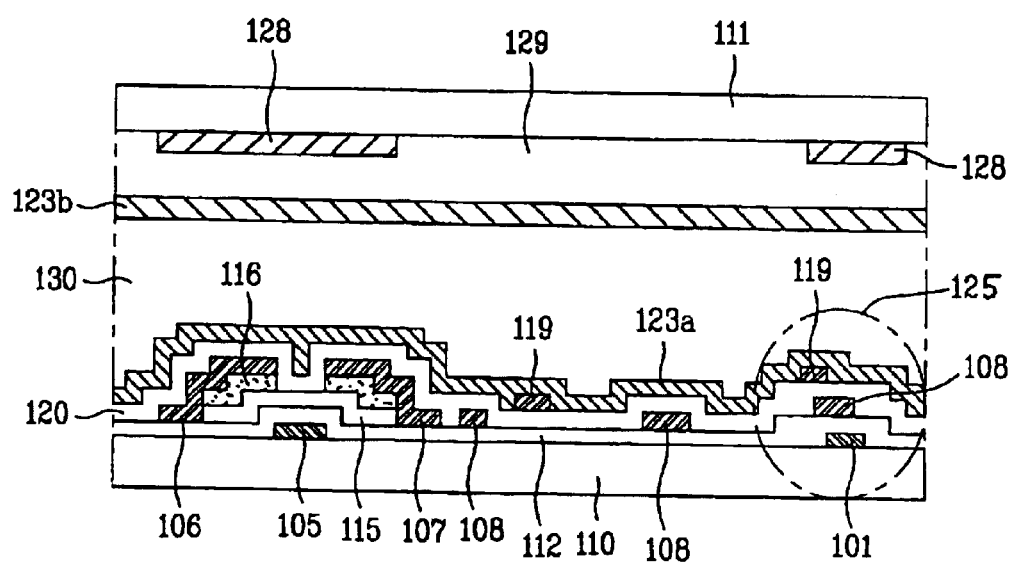
FIG. 3B is a sectional view according to line III–III' of FIG. 3A.

FIG. 3A is a plan view of a unit pixel according to a second embodiment of the present invention. FIG. 3B is a sectional view according to line III–III' of FIG. 3A. Regarding FIGS. 3A and FIG. 3B, the common electrode 119 and the common line 103 cover some part of the data electrode 108 but do not cover the gate bus lines 101, 101'.

Figure 3C:
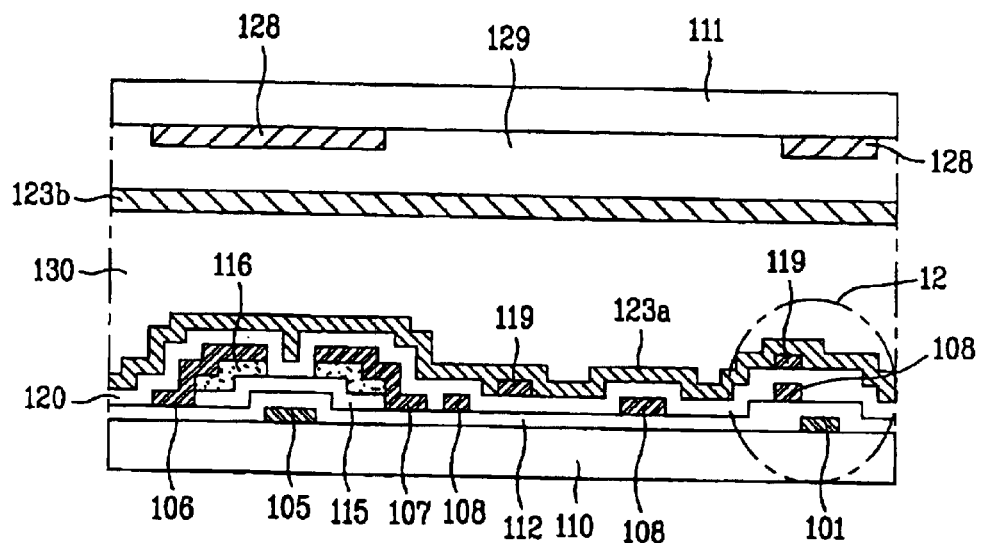
FIG. 3C is a sectional view of a third embodiment of the present invention.

FIG. 3C is a sectional view of a third embodiment of the present invention. In FIG. 3C and similar to FIG. 3B, the common electrode 119 overlaps the data electrode 108.

However, the common electrode 119 and the data electrode 108 do not overlap any portion of the gate bus line 101. The overlapping of the common electrode 119 and the data electrode 108 in effect creates a capacitor between the two layers.

Figure 3D:
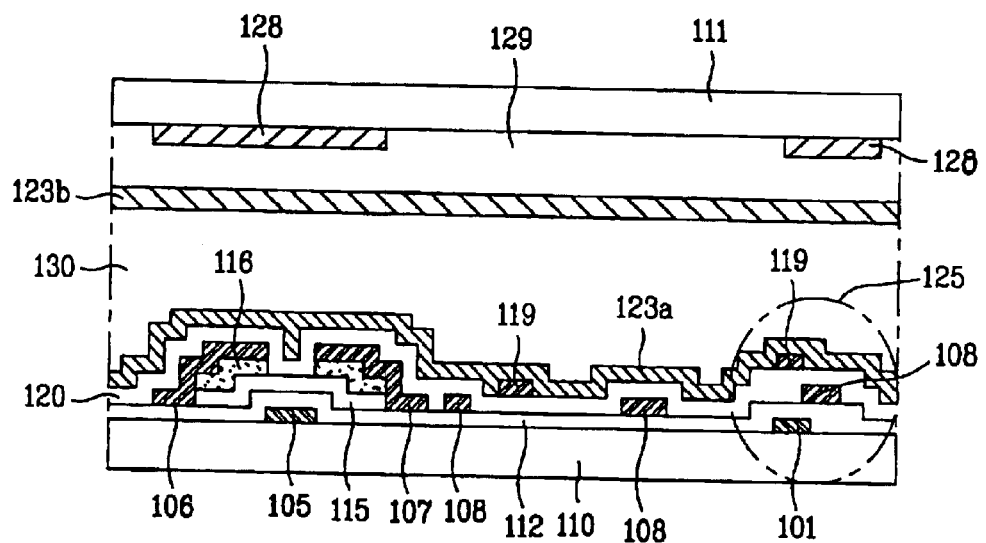
FIG. 3D is a sectional view of a fourth embodiment of the present invention.

FIG. 3D is a sectional view of a fourth embodiment of the present invention. As illustrated, the common electrode 119 does not overlap the data electrode 108, but overlaps the gate bus line 101. In addition, certain portions of the data electrode 108 overlaps the gate bus line 101. The above conductive lines and electrodes in effect creates a capacitor between two overlapping conductive layers. Moreover, certain capacitance is formed even between non-overlapping conductive layers which are in near vicinity of each other.

In accordance with the present invention, it is possible to achieve the high aperture ratio by using SOG mode storage capacitor only, or both SOG mode storage capacitor and SOC mode storage capacitor.

Further, it is possible to prevent the apparatus from a short which may be generated between the gate bus line, the electrode, and the common electrode in the prior art.

It will be apparent to those skilled in the art that various modifications and variation can be made in the in-plane switching mode LCD of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a substrate;
   first and second gate lines arranged substantially in parallel above the substrate;
   a bus line arranged to intersect the first and second gate lines to define a pixel;
   a transistor having a source electrode and a drain electrode formed near an intersection part of the bus line and the first gate line, the source electrode being connected to the bus line;
   at least one data electrode connected to the drain electrode of the transistor;
   a passivation layer formed above the transistors and the at least one data electrode; and
   at least one common electrode arranged above the passivation layer in parallel with the second gate line, the at least one common electrode and the at least one data electrode engaged in an in-plane switching mode, wherein the second gate line is overlapping with the data electrode.

2. The liquid crystal display device of claim 1, wherein the second gate line has no overlapping portions with the data electrode and the common electrode.

3. The liquid crystal display device of claim 2, wherein the second gate bus line and the data electrode form a first storage capacitor.

4. The liquid crystal display device of claim 2, wherein the data electrode and the common electrode form a second storage capacitor.

5. The liquid crystal display device of claim 1, wherein the data electrode has no overlapping portions with the common electrode.

6. The liquid crystal display device of claim 5, wherein the second gate bus line and the data electrode form a first storage capacitor.

7. The liquid crystal display device of claim 5, wherein the data electrode and the common electrode form a second storage capacitor.

8. The liquid crystal display device of claim 1, wherein the second gate line has no overlapping portions with the common electrode.

9. The liquid crystal display device of claim 8, wherein the second gate bus line and the data electrode form a first storage capacitor.

10. The liquid crystal display device of claim 8, wherein the data electrode and the common electrode form a second storage capacitor.

11. The liquid crystal display device of claim 1, wherein a second substrate formed above the substrate;
    a first alignment layer formed above the passivation layer; and
    a second alignment layer formed on the second substrate.

12. The liquid crystal display device of claim 11, wherein the first alignment layer and the second alignment layer comprise one of polyamide, polyimide, $SiO_2$, polyvinylalcohol, polyamic acid and a photosensitive material.

13. The liquid crystal display device of claim 12, wherein the photosensitive material comprises one of polyvinylcinnamage, polysiloxanecinnamate and cellulosecinnamate.

14. A method of manufacturing a liquid crystal display device comprising the steps of:
    providing a substrate;
    forming first and second gate lines arranged substantially in parallel above the substrate;
    forming a bus lines to intersect the first and second gate lines to define a pixel;
    fabricating a transistor having a source electrode and a drain electrode near an intersection part of the bus line and the first gate line, the source electrode being connected to the bus line;
    forming at least one data electrode connected to the drain electrode of the transistor;
    arranging a passivation layer above the transistors and the at least one data electrode; and
    forming at least one common electrode above the passivation layer in parallel with the second gate line, the at least one common electrode and the at least one data electrode, wherein the second gate line is overlapping with the data electrode.

15. The liquid crystal display device of claim 14, wherein the data electrode has no overlapping portions with the common electrode.

16. The liquid crystal display device of claim 15, wherein the second gate bus line and the data electrode form a first storage capacitor.

17. The liquid crystal display device of claim 15, wherein the data electrode and the common electrode form a second storage capacitor.

18. The liquid crystal display device of claim 14, wherein the second gate line has no overlapping portions with the common electrode.

19. The liquid crystal display device of claim 18, wherein the second gate bus line and the data electrode form a first storage capacitor.

20. The liquid crystal display device of claim 18, wherein the data electrode and the common electrode form a second storage capacitor.

* * * * *